US011443285B2

(12) United States Patent
Nasir

(10) Patent No.: US 11,443,285 B2
(45) Date of Patent: Sep. 13, 2022

(54) ARTIFICIAL INTELLIGENCE ENABLED SCHEDULER AND PLANNER

(71) Applicant: International Business Machines Corporation, Armonk, NY (US)

(72) Inventor: Quaid Johar Nasir, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 16/744,444

(22) Filed: Jan. 16, 2020

(65) Prior Publication Data
US 2021/0224753 A1 Jul. 22, 2021

(51) Int. Cl.
*G06Q 10/00* (2012.01)
*G06N 20/00* (2019.01)
*G06Q 10/10* (2012.01)

(52) U.S. Cl.
CPC ......... *G06Q 10/1095* (2013.01); *G06N 20/00* (2019.01)

(58) Field of Classification Search
CPC .......................................... G06Q 10/00–50/00
USPC ................................ 705/7.11–7.42
See application file for complete search history.

(56) References Cited

U.S. PATENT DOCUMENTS

| 5,442,730 | A | 8/1995 | Bigus |
| 7,343,312 | B2 | 3/2008 | Capek |
| 8,074,175 | B2 | 12/2011 | Brush |
| 2006/0053044 | A1 | 3/2006 | Kurian |
| 2006/0200374 | A1* | 9/2006 | Nelken ............... G06Q 10/109 |
| | | | 705/7.19 |
| 2012/0316911 | A1 | 12/2012 | Schwarz |
| 2013/0103444 | A1 | 4/2013 | Agarwal |
| 2013/0204653 | A1* | 8/2013 | Herger ............... G06Q 10/109 |
| | | | 705/7.19 |
| 2015/0324754 | A1* | 11/2015 | Bathiya ............. G06Q 10/1095 |
| | | | 705/7.19 |

(Continued)

FOREIGN PATENT DOCUMENTS

WO 2012170877 A3 5/2013

OTHER PUBLICATIONS

Beard et al., "A visual calendar for scheduling group meetings", Proceedings of the 1990 ACM conference on Computer-supported cooperative work, ACM, 1990.

(Continued)

*Primary Examiner* — Mustafa Iqbal
(74) *Attorney, Agent, or Firm* — Gavin Giraud

(57) ABSTRACT

Aspects of the present invention disclose a method for resolving schedule planning conflicts without human arbitration based on user preferences, user role importance, and user time commitments. The method includes one or more processors generating a schedule of a project. The method further includes identifying a meeting request of the schedule of the project, wherein the meeting request includes a plurality of requested meeting participants. The method further includes identifying respective available time slots of the plurality of requested meeting participants. The method further includes identifying respective roles of the plurality of requested meeting participants. The method further includes determining a first time slot for scheduling the meeting request of the project based at least in part on the available time slots and roles of the plurality of requested meeting participants.

20 Claims, 4 Drawing Sheets

(56) References Cited

U.S. PATENT DOCUMENTS

| | | | |
|---|---|---|---|
| 2015/0356516 A1* | 12/2015 | Kagan | G06Q 10/1095 |
| | | | 705/7.19 |
| 2016/0171452 A1* | 6/2016 | Brown | G06Q 10/1095 |
| | | | 705/7.19 |
| 2016/0267439 A1 | 9/2016 | Bitran | |
| 2019/0180248 A1* | 6/2019 | Byun | G06Q 10/1095 |
| 2019/0266573 A1* | 8/2019 | Radhakrishnan | G06Q 10/1095 |
| 2019/0267133 A1* | 8/2019 | Schwarz | G06Q 10/1095 |
| 2020/0293999 A1* | 9/2020 | Bhattacharya | G06N 20/00 |

OTHER PUBLICATIONS

Brozowski et al., "groupTime: preference based group scheduling", Proceedings of the SIGCHI conference on Human Factors in computing systems, ACM, 2006.

Gervasio et al., "Active preference learning for personalized calendar scheduling assistance", Proceedings of the 10th international conference on Intelligent user interfaces, ACM, 2005.

Miyashita et al., "CABINS: a framework of knowledge acquisition and iterative revision for schedule improvement and reactive repair", Artificial Intelligence 76.1-2 (1995): 377-426.

\* cited by examiner

ARTIFICIAL INTELLIGENCE ENABLED SCHEDULER AND PLANNER

BACKGROUND OF THE INVENTION

The present invention relates generally to the field of machine learning and more particularly to schedule conflict resolution.

Machine learning is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as "training data", in order to make predictions or decisions without being explicitly programmed to perform the task. Machine learning algorithms are used in a wide variety of applications.

Intelligent agents are software components that are capable of learning certain behaviors over time through complex autonomic algorithms. Intelligent agents can have many different capabilities, from simply monitoring for certain events to more complex actions. The goal of using agents is to simplify a system administrator's tasks through autonomic computing.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system resolving schedule planning conflicts without human arbitration based on user preferences, user role importance, and user time commitments. The method includes one or more processors generating a schedule of a project. The method further includes one or more processors identifying a meeting request of the schedule of the project, wherein the meeting request includes a plurality of requested meeting participants. The method further includes one or more processors identifying respective available time slots of the plurality of requested meeting participants. The method further includes one or more processors identifying respective roles of the plurality of requested meeting participants. The method further includes one or more processors determining a first time slot for scheduling the meeting request of the project based at least in part on the available time slots and roles of the plurality of requested meeting participants.

DETAILED DESCRIPTION

Embodiments of the present invention allow for resolving schedule planning conflicts without human arbitration based on user preferences, user role importance, and user time commitments. Embodiments of the present invention utilize a machine learning algorithm to generate one or more templates for plans and schedules of a project specific to a domain. Embodiments of the present invention provide a productivity enhancement tool that resolves scheduling conflicts among meeting participants. Additional embodiments of the present invention provide an adaptive management planner that monitors and modifies a management plan of a project.

Some embodiments of the present invention recognize that challenges exist in existing calendar applications due to information asymmetry, where all entries in time blocks of the calendar applications are considered unalterable. As a result, a project schedule may be unduly delayed due to conflicts in availability of meeting participates in efforts to identify an adequate time slot, which also results in a loss of productivity due to the effort spent identifying a common available time slot. Furthermore, existing calendar applications are passive tools that provide no assistance regarding effective time management or personal/professional goals and priorities. Various embodiments of the present invention resolve these challenges by utilizing machine learning to learn individual preferences, importance of user roles, and user time commitments to arbitrate schedule planning without the need for manual effort and time.

Embodiments of the present invention can operate to reduce the amount of processing resources utilized by reducing the number of tasks performed (e.g., email, messages, etc.) associated with scheduling a meeting of a group of participants based on identifying available time slots of each individual of the group. Additionally, various embodiments of the present invention improve scheduling and planning software by eliminating and/or reducing user interaction by removing the need to update scheduling after determining a modification.

Implementation of embodiments of the invention may take a variety of forms, and exemplary implementation details are discussed subsequently with reference to the Figures.

Figure 1:
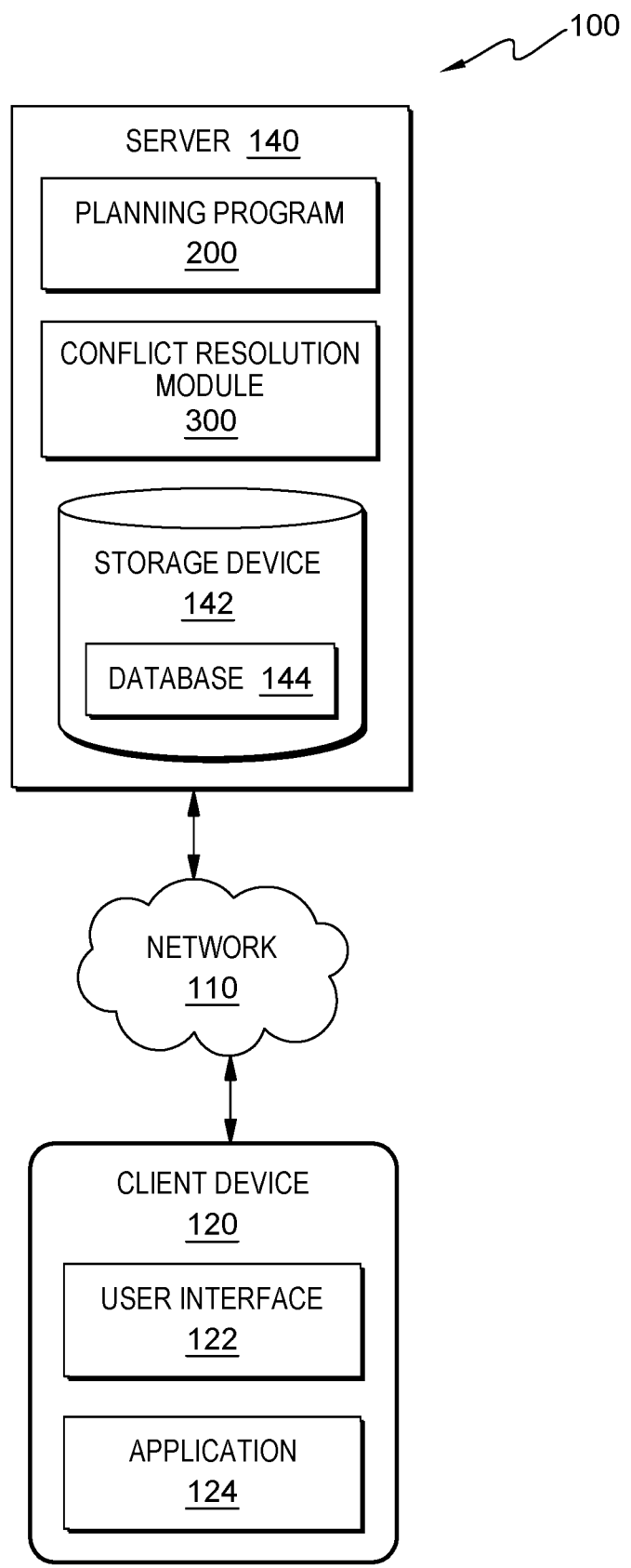
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Planning program 200 enables the authorized and secure processing of personal data by conflict resolution module 300. Planning program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Planning program 200 provides information regarding personal data and the nature (e.g., type, scope, purpose, duration, etc.) of the processing by conflict resolution module 300. Planning program 200 provides the user with copies of stored personal data. Planning program 200 allows the correction or completion of incorrect or incomplete personal data. Planning program 200 allows the immediate deletion of personal data.

Distributed data processing environment 100 includes server 140 and client device 120, all interconnected over network 102. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, client device 120, and other computing devices (not shown) within distributed data processing environment 100.

Client device 120 can be one or more of a laptop computer, a tablet computer, a smart phone, smart watch, a smart speaker, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 4, in accordance with embodiments of the present invention.

Client device 120 may include one or more a processor, user interface 122, and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, a user utilizes application 124 of client device 120 to register planning program 200 and define user preferences. In one embodiment, application 124 is a calendar application that planning program 200 utilizes to retrieve available time slots for a user.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, conflict resolution module 300, and planning program 200. Storage device 142 can be implemented with any type of storage device, for example, persistent storage 405, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores a plurality of information, such as database 144. Database 144 may represent one or more organized collections of data stored and accessed from server 140. For example, database 144 includes features of past projects (e.g., project tasks, milestones, etc.), scoring data, user preferences, user roles, and/or user schedules. In one embodiment, data processing environment 100 can include additional servers (not shown) that host additional information that accessible via network 110.

Generally, planning program 200 is an adaptive project management planner that embodiments of the present invention can utilize to organize time in order to meet project requirements according to a feedback mechanism based on previous project histories. For example, planning program 200 can utilize machine learning algorithms to schedule a team project based on prioritized milestones and individual schedules. In this example, planning program 200 can integrate calendar data (e.g., event entries, itineraries, etc.) with a project plan to manage individual and team schedules based on the shifting individual schedules and project priorities. In various embodiments of the present invention, planning program 200 can operate to organize time for a project between two or more stakeholders using machine learning algorithms to learn from past projects (i.e., uses machine learning advance progress in project management, team time and task management, highlight dependencies, and create and continuously refine timelines based on project progress).

In one embodiment, planning program 200 creates a knowledge base of past projects that includes effort needed, task timeline, resource allocation, and dependencies, to deliver project milestones with statistical confidence scores in database 144, which is utilized to generate project management templates. In another embodiment, planning program 200 generates a set of artifacts for intermediate project milestones with respect to a final deliverable timeline for general availability. In another embodiment, planning program 200 utilizes user inputs of client device 120 to determine a success rate of achieving a final goal and may generate adjustment recommendation. In yet another embodiment, planning program 200 utilizes conflict resolution module 300 to schedule meetings of participants based on priority of a milestone and a role of one or more participants.

Generally, conflict resolution module 300 is a weighted scoring system to that determines which time slots are flexible in order to schedule a meeting between required parties. In various embodiments of the present invention, conflict resolution module 300 considers a role of a participant in determining the flexibility of the schedule, the number of participants involved in the conflicting schedule block, whether the time slot is used for personal task that can be moved, and the priority of each schedule block based on a timeline of a project. Thus, conflict resolution module 300 uses a weighted scoring system to eliminate the long trail of manual touch points and negotiations between various participants to negotiate a schedule conflict. In one embodiment, conflict resolution module 300 is a subprogram of planning program 200. For example, conflict resolution module 300 is a set of instructions designed to perform a frequently used operation within a planning program 200.

In one embodiment, conflict resolution module 300 utilizes data of application 124 to determine whether a time block of a schedule of a user is soft or hard. For example, conflict resolution module 300 retrieves a calendar of events for a user and determines whether the event is a meeting (e.g., hard time block) or a task (e.g., soft time block). In another embodiment, conflict resolution module 300 ranks time blocks of a user based on a role that the user performs. For example, determines whether a role (e.g., position, job, etc.) of a participant includes a more rigid schedule (i.e., includes more meetings versus personal tasks) and is less flexible for rescheduling. In another embodiment, conflict resolution module 300 utilizes a characterization of a time block, role of a participant, and preferences of a participant to determine an available time block for scheduling or rescheduling a meeting.

Figure 2:
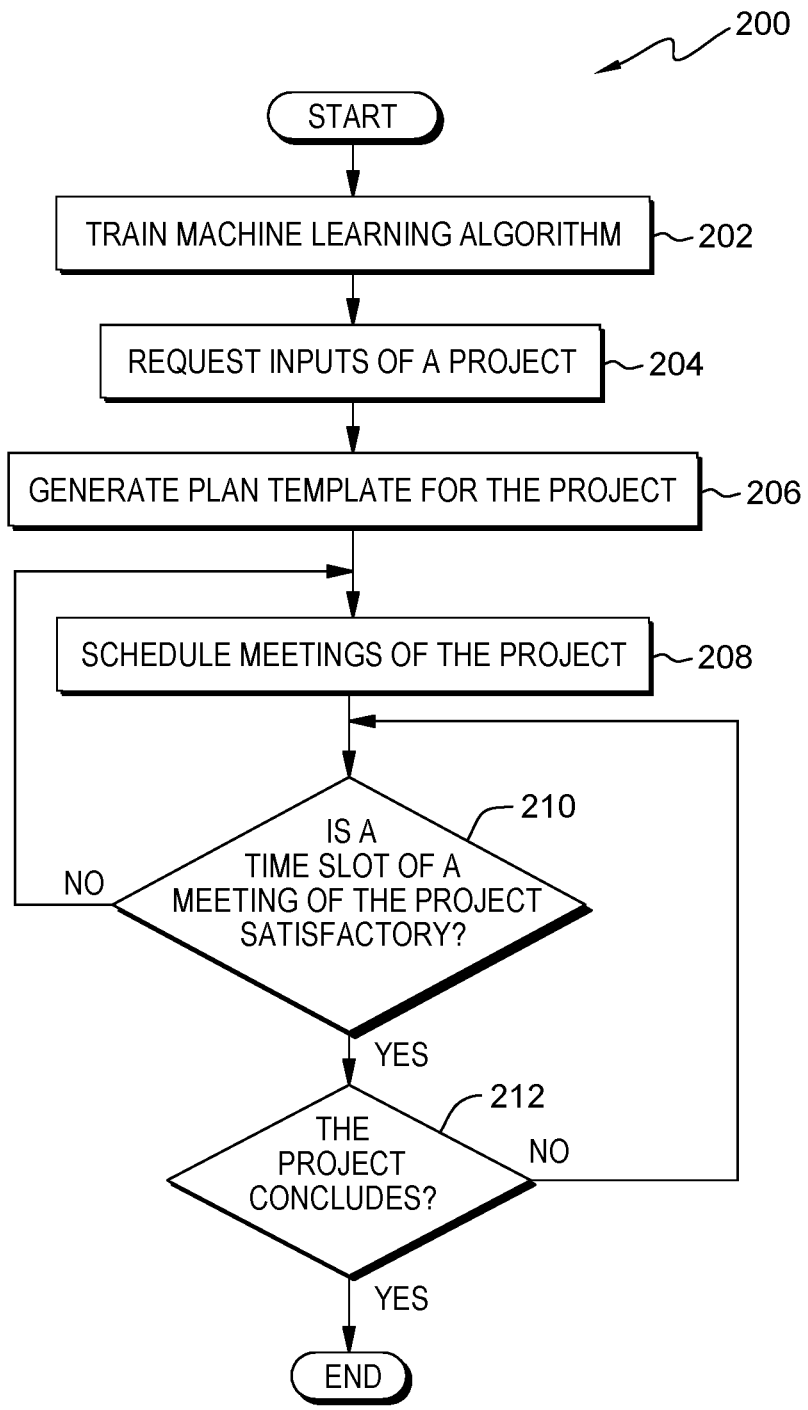
FIG. 2 is a flowchart depicting operational steps of a program, within the data processing environment of FIG. 1, for resolving schedule planning conflicts without human arbitration based on user preferences, user role importance, and user time commitments, in accordance with embodiments of the present invention.

FIG. 2 is a flowchart depicting operational steps of planning program 200, a program to resolve schedule planning conflicts without human arbitration based on user preferences, user role importance, and user time commitments, in accordance with embodiments of the present invention. In one embodiment, planning program 200 initiates in response to client device 120 transmitting a user request. For example, planning program 200 initiates when a user submits a meeting request in an application of a computing device (e.g., client device 120) of the user. In another embodiment, planning program 200 is continuously monitoring client device 120. For example, planning program 200 is constantly monitoring a computing device (e.g., client device 120) of a user after a user registers the computing device planning program 200.

In step 202, planning program 200 trains a machine learning algorithm. In one embodiment, planning program 200 creates a knowledge base in database 144 and utilizes the knowledge base to train a machine learning algorithm to identify a project of a user. For example, planning program 200 utilizes a database (e.g., database 144) of past projects to train a machine learning algorithm to identify project in the database that include similar features as a current project. In this example, planning program 200 trains the machine learning algorithm to identify user preferences, relative importance of a role of a user, and identify time commitments of participants in the current project to arbitrate schedule planning without user intervention. In another example, planning program 200 captures and stores data (e.g., general availability dates, milestones, durations, dependencies, number of participants, etc.) of previous projects in a database (e.g., database 144). Additionally, planning program 200 creates a vectorized set of training data, which includes one or more inputs and a desired output. In this example, planning program 200 utilizes the trained machine learning algorithm to identify previous projects of the knowledge base that include similar features as the project of the user and success scores of the identified previous projects.

In step 204, planning program 200 requests inputs of a project. In one embodiment, planning program 200 transmits a request to client device 120 for details and deliverables of a user project. For example, planning program 200 provides a request for a user to enter names of various stakeholders, roles of participants on a project and deliverables (e.g., General Availability (GA) date, intermediate milestones such as Tech Preview or Limited Availability, etc.). In another example, planning program 200 may retrieve roles of participants from peripheral data sources (e.g., databases, websites, etc.).

In step 206, planning program 200 generates a plan template for the project. In one embodiment, planning program 200 utilizes database 144 to generate one or more templates for a user project based on the inputs of the user. Generally, a template is a preset format for one or more documents of a set of artifacts or project, used so that the format does not have to be re-created each time a document used. For example, planning program 200 generates a set of artifacts for intermediate project milestones with respect to a final deliverable timeline for general availability. Additionally, artifacts can include documents and spreadsheets that are related to a project that align business objectives, address the needs of sponsors and clients, and properly set the project expectations. In this example, planning program 200 retrieves one or more templates associated with a previous project (identified in step 202) from a knowledge base (e.g., database 144) and populate the one or more templates with data provided by a user (in step 204). Also, the one or more templates can include plans and schedules with milestones for high-level tasks, durations and dependencies specific to a domain (e.g., feature in public, private, or hybrid cloud) of the project. Furthermore, planning program 200 can provide a recommendation to a user to schedule initial meetings with stakeholders and participants based on available time blocks.

In step 208, planning program 200 schedules meetings of the project. In one embodiment, planning program 200 utilizes conflict resolution module 300 to schedule meetings for a project based on data of database 144 and application 124. For example, planning program 200 utilizes conflict resolution module 300 to analyze individual schedule constraints and preferences to identify a suitable time block that maximizes overall productivity of participants of a project. Step 208 may include further implementation as described in further detail with respect to FIG. 3, in accordance with embodiments of the present invention.

In decision step 210, planning program 200 determines whether a time slot of a meeting of the project is satisfactory. In one embodiment, planning program 200 monitors inputs of a project to determine whether a time slot of a meeting of the project is suitable. For example, planning program 200 monitors a user interface of a computing device (e.g., client device 120) to identify whether the user adjusts a project template and one or more meetings that may cause the duration of the project to extend past deadlines of key milestones of the project.

If planning program 200 determines that a time slot of a meeting of a project is not satisfactory (decision step 210, "NO" branch), then planning program 200 returns to step 208 to identify a suitable time slot for the meeting of the project. For example, if planning program 200 identifies that a user adjusts a project template and one or more meetings that cause the duration of the project to extend past deadlines of key milestones of the project, then planning program 200 schedules one or more meetings based on project priorities and individual availabilities and making suggestions on which meetings are needed, which participants should be invited, and the best availability for the participants involved. In another example, if planning program 200 detects that during the course of project execution some deliverables extend past designated deadlines of a generated template, then planning program 200 readjusts other task schedules of the template of the project based on dependencies and creates alerts to the user based on learnings from previous projects where a similar delay impacts a risk of timely delivery of the project.

If planning program 200 determines that a time slot of a meeting of a project is satisfactory (decision step 210, "YES" branch), then planning program 200 continues to monitor the project until the project concludes. For example, if planning program 200 identifies that a user adjusts a project template and one or more meetings do not cause the duration of the project to extend past deadlines of key milestones of the project, then planning program 200 continues to track and learn from manual adjustments of the user.

In decision step 212, planning program 200 determines whether the project concludes. In one embodiment, planning program 200 determines whether one or more events of a project are complete. For example, planning program 200 monitors a project to determine whether key milestones, dependencies, meetings, project priority tasks, deliverables, and/or general availability tasks (e.g., events) of a project are complete. In another example, planning program 200 monitors a user interface of a computing device (e.g., client device 120) to identify whether a user manually adjusts an event of a project template.

If planning program 200 determines that one or more events of a project are not complete (decision step 212, "NO" branch), then planning program 200 returns to step 210 to monitor inputs of the project to determine whether a time slot of a meeting of the project is suitable. For example, if planning program 200 detects that a deadline and/or deliverable of a key milestones, dependencies, meetings, project priority tasks, deliverables, or general availability tasks of a project has not past and/or been delivered, then planning program 200 continues to monitor a user interface of a computing device (e.g., client device 120) to identify manual adjustments to an event of the project.

If planning program 200 determines that one or more events of a project are complete (decision step 212, "YES" branch), then planning program 200 concludes. For example, if planning program 200 determines that each deliverable and/or deadline of a project has been delivered and/or past, then planning program 200 terminates.

Figure 3:
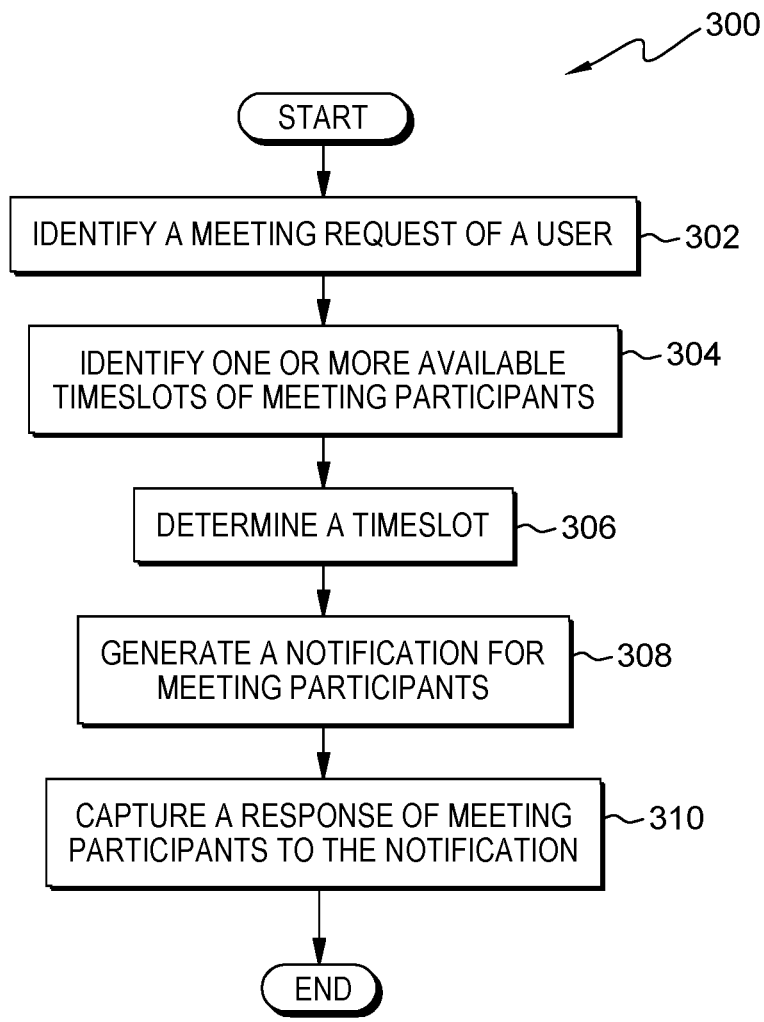
FIG. 3 is a flowchart depicting operational steps of a program, within the data processing environment of FIG. 1, for determining which time slots are flexible in order to schedule a meeting between required parties, in accordance with embodiments of the present invention.

FIG. 3 is a flowchart depicting operational steps of conflict resolution module 300, a program to determines which time slots are flexible in order to schedule a meeting between required parties, in accordance with embodiments of the present invention. In one embodiment, conflict resolution module 300 initiates in response to client device 120 transmitting a user request. For example, conflict resolution module 300 initiates when a user submits a meeting request in an application of a computing device (e.g., client device 120) of the user to planning program 200. In another embodiment, conflict resolution module 300 is continuously monitoring client device 120. For example, conflict resolution module 300 is constantly monitoring a computing device (e.g., client device 120) of a user after a user registers the computing device planning program 200 determine whether a scheduled time of a meeting is satisfactory.

In step 302, conflict resolution module 300 identifies a meeting request of a user. In various embodiments of the present invention, a user and attendees of a meeting opt-in and allow planning program 200 and conflict resolution module 300 extract identifying information as well as allow access to calendar information. In one embodiment, conflict resolution module 300 identifies a meeting request of client device 120. For example, a user generates a meeting request with required/optional attendees in a scheduling time window using a computing device (e.g., client device 120) and transmits the meeting request to a server (e.g., server 140). In this example, conflict resolution module 300 detects that planning program 200 is receiving the meeting request and extracts names and calendar data of the required/optional attendees and stores the extracted information in a database (e.g., database 144) of the server.

In step 304, conflict resolution module 300 identifies one or more available time slots of meeting participants. In one embodiment, conflict resolution module 300 utilizes data corresponding to a meeting request to identify one or more suitable time slots of participants of the meeting request. For example, conflict resolution module 300 retrieves extracted calendar data (e.g., scheduled meetings, scheduled paid time off, tasks, time zone, etc.) of required/optional attendees of a meeting request from a database of a server. In this example, conflict resolution module 300 identifies open (e.g., no scheduled events), hard, and soft time slots of the required/optional attendees. Additionally, conflict resolution module 300 can assign a weighted score to one or more identified time slots based on events of the identified time slots. Furthermore, conflict resolution module 300 can determine an average weighted score for each identified time slot based on individual scores of the required/optional attendees. In another example, conflict resolution module 300 may access a calendar application of a user to retrieve calendar data of the user.

In another example, conflict resolution module 300 may assign a maximum weighted score of ten (10) to a customer meeting or personal appointment in an identified time slot for a meeting participant. Additionally, conflict resolution module 300 may assign a weighted score to a time slot that includes a personal task based on the importance and urgency of the task (i.e., personal tasks that effect a deadline or milestone may be scored higher than personal organization time). Furthermore, conflict resolution module 300 may assign a weighted score to a time slot that includes a one (1) on one (1) meeting lower than a time slot that includes ten (10) participant meeting.

In one scenario, if conflict resolution module 300 does not identify an open time slot, then conflict resolution module 300 identifies hard and soft time slots. In this scenario, conflict resolution module 300 assigns a weighted score to time slot based on events contained within that time slot. For example, conflict resolution module 300 assigns a weighted score to a time slot (e.g., on a scale of one (1) to ten (10), where (10) is a highest integer value) based on which time slots are easier (e.g., soft blocks) to move in comparison to immovable (e.g., hard blocks) time slots. A soft time slot is negotiable based on an assigned weight of the soft time slot (e.g., fewer participants=lower weight) vs large number of participants (e.g., higher weight), and a hard time slot is considered immovable based on an assigned weight of the hard time slot (e.g., Personal Time Off (PTO) or a personal appointment).

In yet another example, conflict resolution module 300 assigns a weighted score for required/optional attendees of a meeting request based on a role in an organization and in the meeting request (e.g., presenter). In this example, conflict resolution module 300 utilizes an identifier (e.g., name, email address, etc.) of the required/optional attendees to identify a role (e.g., job, position, title, schedule type, etc.) of the required/optional attendees from a database of a server or from a peripheral location accessible via the internet (e.g., network 110).

Additionally, some required/optional attendees are harder to reschedule meetings with (e.g. executives, shift workers, or any person that has a more rigid schedule). Thus, conflict resolution module 300 utilizes the information in a weighted prioritization of hard and soft time slots to assign a weighted score to the required/optional attendees based on a role or/and location of the required/optional attendees. In one scenario, conflict resolution module 300 may assign a higher weighted score to a participant with a role as a general manager as compared to a director. In another scenario, conflict resolution module 300 may assign a higher weighted score to a participant with a role as a data center operator with scheduled shifts as compared to a non-shift employee.

In step 306, conflict resolution module 300 determines a time slot. In one embodiment, conflict resolution module 300 determines a time slot to assign to a meeting request of a user. For example, conflict resolution module 300 combines weighted scores of hard and soft time slots of required/optional attendees of a meeting request, roles of the required/optional attendees of the meeting request, and preferences (e.g., prefers morning meetings, prefers evening meetings, etc.) of the required/optional attendees based on past behaviors to determine a composite score for each time slot to identify one or more time slots that may be utilized for scheduling a meeting. In this example, conflict resolution module 300 can rank the composite score of one or more time slots to identify a time slot that is amenable to scheduling constraints of the required/optional attendees. Additionally, conflict resolution module 300 stores each iteration in a database (e.g., database 144) to assist future learning.

In another example, conflict resolution module 300 identifies time slots with a composite score less than or equal to a defined threshold. In this example, conflict resolution module utilizes an average weighted score for each time slot of participants to compare with the defined threshold (e.g., the defined threshold may be a system defined value). Furthermore, conflict resolution module 300 determines that each time slot that is assigned a weighted score that is less than or equal to the defined threshold is labeled as a soft time slot for each of the participants. Additionally, conflict resolution module 300 uses an average weighted score of the participants (e.g., the composite score) to identify one or more soft time slots.

In step 308, conflict resolution module 300 generates a notification for meeting participants. In one embodiment, conflict resolution module 300 creates a response to a meeting request of a user. For example, conflict resolution module 300 generates a response to a meeting request of a user. In this example, conflict resolution module 300 creates a notification that includes a proposed rescheduling notice for the conflicted time slots of the meeting request, based on a lower weighted composite score, that can be transmitted to a computing device (e.g., client device 120) of the user. In one scenario, if users involved in the conflicted time slot accept the proposed rescheduling notice of conflict resolution module 300 (i.e., to free-up that time slot for the new requested meeting), then conflict resolution module 300 transmits the rescheduling notice to all involved attendees of the conflicted time slot. Additionally, following the successful rescheduling of the conflicted time slot, the scheduling notice is sent out to all the attendees for the new requested meeting.

In another scenario, if users involved in the conflicted time slot do not accept a proposed rescheduling notice of conflict resolution module 300, then the conflict resolution module 300 can iterate to find another time slot based on a relatively lower weighted composite score to repeat the above process for conflict resolution. Furthermore, conflict resolution module 300 continues to iterate until a time slot is successfully freed by rescheduling the conflicted time slot and the new requested meeting can be scheduled.

In step 310, conflict resolution module 300 captures a response of meeting participants to the notification. In one embodiment, conflict resolution module 300 captures received responses of planning program 200 from client device 120 to update a knowledge base of database 144. For example, conflict resolution module 300 stores a response of one or more requested attendees of a meeting request in a database (e.g., database 144) of a server. In this example, conflict resolution module 300 may input a response into a machine learning algorithm to identify conditions (e.g., user preferences) under which each requested attendee accepts or rejects a rescheduling notice.

Figure 4:
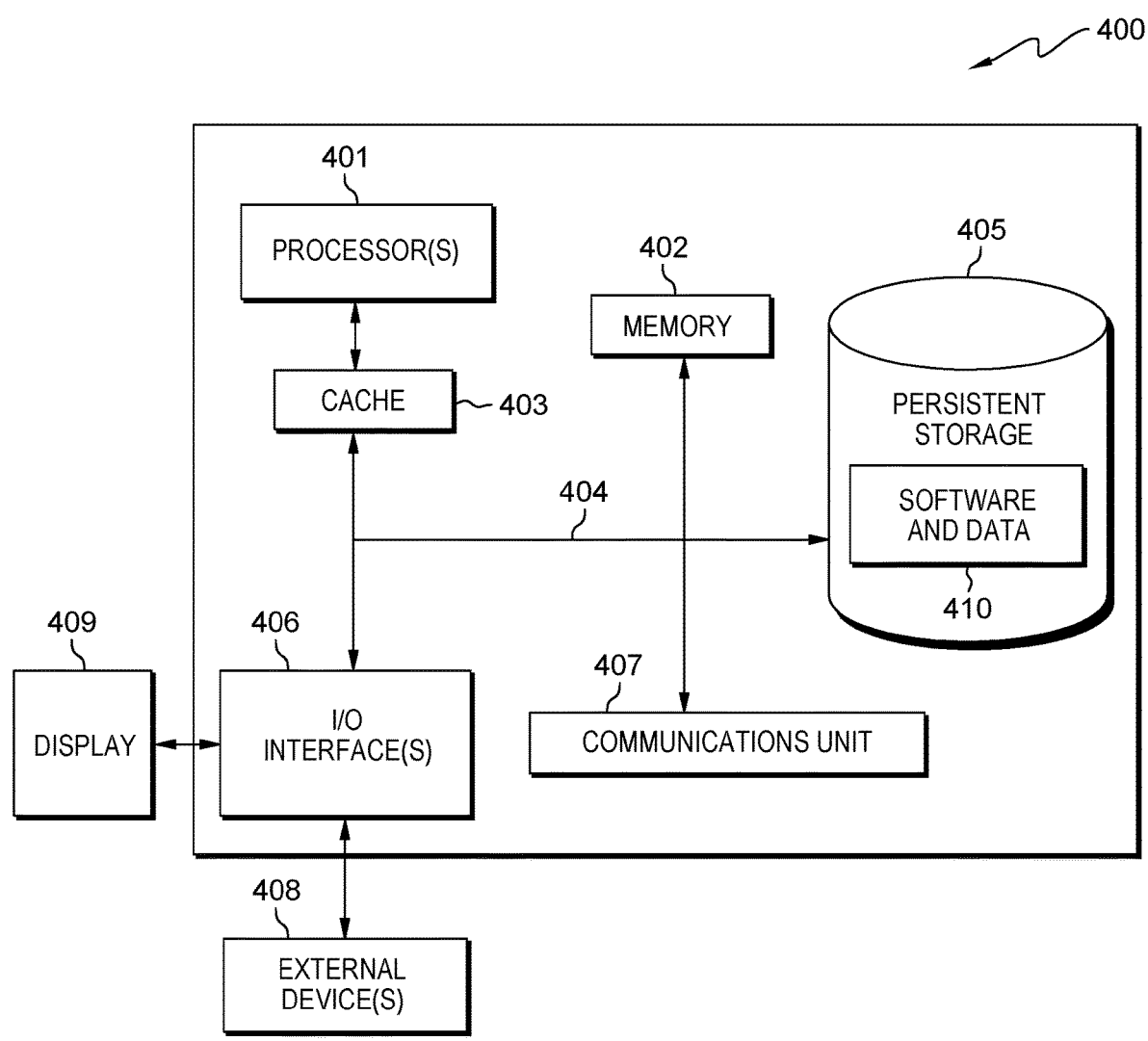
FIG. 4 is a block diagram of components of the client device and server of FIG. 1, in accordance with an embodiment of the present invention.

FIG. 4 depicts a block diagram of components of client device 120 and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to server 140, software and data 410 includes data of storage device 142, database 144, planning program 200, and conflict resolution module 300.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   training, by one or more processors, a machine learning knowledge base using a database of past projects, wherein the past projects are fed through a feedback loop to identify features within the past projects;
   generating, by one or more processors, a schedule of a project based on the machine learning knowledge base matching features of the project to similar features of the past projects, wherein the schedule comprises meeting requests;
   identifying, by one or more processors, a first meeting request comprising a characterization of a time block and a plurality of requested meeting participants;
   identifying, by one or more processors, respective available time slots of the plurality of requested meeting participants;
   identifying, by one or more processors, respective roles of the plurality of requested meeting participants associated with the characterization of the time block; and
   determining, by one or more processors, a first time slot for scheduling the meeting request of the project based at least in part on the available time slots and roles of the plurality of requested meeting participants; and
   training, by one or more processors, the machine learning knowledge base by inserting features from the first time slot into the feedback loop to identify additional features within the past projects.

2. The method of claim 1, further comprising:
   in response to determining that a time slot is not compliant with constraints of a first participant of the plurality of requested meeting participants and the schedule of the project, inputting, by one or more processors, the constraints of the first participant and the schedule of the project into a machine learning algorithm;
   determining, by one or more processors, preferences of the first participant; and determining, by one or more processors, a second time slot for scheduling a meeting corresponding to the meeting request.

3. The method of claim 2, further comprising:
identifying, by one or more processors, the role of the first participant, wherein the first participant is a host of the meeting of the meeting request; and
excluding, by one or more processors, one or more time slots of the identified respective available time slots, wherein the one or more time slots conflict with the preferences of the first participant.

4. The method of claim 1, further comprising:
generating, by one or more processors, a notification that includes a proposed rescheduling notice; and
transmitting, by one or more processors, the notification to one or more participants of the plurality of requested meeting participants.

5. The method of claim 1, wherein identifying the respective available time slots of the plurality of requested meeting participants, further comprises:
retrieving, by one or more processors, calendar data corresponding to a first participant;
identifying, by one or more processors, one or more available time slots of the calendar data, wherein the one or more available time slots is selected from a group consisting of: hard time slots and soft time slots, wherein the hard time slots and soft time slots are characterized by an assigned weighted score that is based at least in part on a role of the first participant; and
assigning, by one or more processors, a weighted score to the one or more available time slots based on events of the one or more available time slots.

6. The method of claim 1, wherein identifying the respective roles of the plurality of requested meeting participants, further comprises:
retrieving, by one or more processors, data corresponding to a role of a first participant of the meeting;
determining, by one or more processors, a flexibility of a schedule corresponding to the role of the first participant of the meeting; and
assigning, by one or more processors, a weighted score to the role of the first participant of the meeting based on the flexibility of the schedule associated with the role of the first participant of the meeting.

7. The method of claim 6, wherein determining the first time slot for scheduling the meeting request of the project based at least in part on the available time slots and roles of the plurality of requested meeting participants, further comprises:
generating, by one or more processors, a composite score for each of time slot of one or more time slots, wherein a weighted score of a role of one or more participants and a weighted score of one or more available time slots of the calendar data of the one or more participants is combined; and
identifying, by one or more processors, each composite score that is above a defined threshold value, wherein each composite score corresponds to one available time slot.

8. A computer program product comprising:
one or more computer readable storage media and program instructions stored on the one or more computer readable storage media, the program instructions comprising:
program instructions to train a machine learning knowledge base using a database of past projects, wherein the past projects are fed through a feedback loop to identify features within the past projects;
program instructions to generate a schedule of a project based on the machine learning knowledge base matching features of the project to similar features of the past projects wherein the schedule comprises meeting requests;
program instructions to identify a first meeting request comprising a characterization of a time block and a plurality of requested meeting participants;
program instructions to identify respective available time slots of the plurality of requested meeting participants;
program instructions to identify respective roles of the plurality of requested meeting participants associated with the characterization of the time block;
program instructions to determine a first time slot for scheduling the meeting request of the project based at least in part on the available time slots and roles of the plurality of requested meeting participants; and
program instructions to train the machine learning knowledge base by inserting features from the first time slot into the feedback loop to identify additional features within the past projects.

9. The computer program product of claim 8, further comprising program instructions, stored on the one or more computer readable storage media, to:
in response to determining that a time slot is not compliant with constraints of a first participant of the plurality of requested meeting participants and the schedule of the project, input the constraints of the first participant and the schedule of the project into a machine learning algorithm;
determine preferences of the first participant; and
determine a second time slot for scheduling a meeting corresponding to the meeting request.

10. The computer program product of claim 9, further comprising program instructions, stored on the one or more computer readable storage media, to:
identify the role of the first participant, wherein the first participant is a host of the meeting of the meeting request; and
exclude one or more time slots of the identified respective available time slots, wherein the one or more time slots conflict with the preferences of the first participant.

11. The computer program product of claim 8, further comprising program instructions, stored on the one or more computer readable storage media, to:
generate a notification that includes a proposed rescheduling notice; and
transmit the notification to one or more participants of the plurality of requested meeting participants.

12. The computer program product of claim 8, wherein program instructions to identify the respective available time slots of the plurality of requested meeting participants, further comprise program instructions to:
retrieve calendar data corresponding to a first participant;
identify one or more available time slots of the calendar data, wherein the one or more available time slots is selected from a group consisting of: hard time slots and soft time slots, wherein the hard time slots and soft time slots are characterized by an assigned weighted score that is based at least in part on a role of the first participant; and assign a weighted score to the one or more available time slots based on events of the one or more available time slots.

13. The computer program product of claim 8, wherein program instructions to identify the respective roles of the plurality of requested meeting participants, further comprise program instructions to:
retrieve data corresponding to a role of a first participant of the meeting;
determine a flexibility of a schedule corresponding to the role of the first participant of the meeting; and
assign a weighted score to the role of the first participant of the meeting based on the flexibility of the schedule associated with the role of the first participant of the meeting.

14. The computer program product of claim 13, wherein program instructions to determine the first time slot for scheduling the meeting request of the project based at least in part on the available time slots and roles of the plurality of requested meeting participants, further comprise program instructions to:
generate a composite score for each of time slot of one or more time slots, wherein a weighted score of a role of one or more participants and a weighted score of one or more available time slots of the calendar data of the one or more participants is combined; and
identify each composite score that is above a defined threshold value, wherein each composite score corresponds to one available time slot.

15. A computer system comprising:
one or more computer processors;
one or more computer readable storage media; and
program instructions stored on the computer readable storage media for execution by at least one of the one or more processors, the program instructions comprising:
program instructions to train a machine learning knowledge base using a database of past projects, wherein the past projects are fed through a feedback loop to identify features within the past projects;
program instructions to generate a schedule of a project based on the machine learning knowledge base matching features of the project to similar features of the past projects, wherein the schedule comprises meeting requests;
program instructions to identify a first meeting request comprising a characterization of a time block and a plurality of requested meeting participants;
program instructions to identify respective available time slots of the plurality of requested meeting participants;
program instructions to identify respective roles of the plurality of requested meeting participants associated with the characterization of the time block;
program instructions to determine a first time slot for scheduling the meeting request of the project based at least in part on the available time slots and roles of the plurality of requested meeting participants; and
program instructions to train the machine learning knowledge base by inserting features from the first time slot into the feedback loop to identify additional features within the past projects.

16. The computer system of claim 15, further comprising program instructions, stored on the one or more computer readable storage media for execution by at least one of the one or more processors, to:
in response to determining that a time slot is not compliant with constraints of a first participant of the plurality of requested meeting participants and the schedule of the project, input the constraints of the first participant and the schedule of the project into a machine learning algorithm;
determine preferences of the first participant; and
determine a second time slot for scheduling a meeting corresponding to the meeting request.

17. The computer system of claim 16, further comprising program instructions, stored on the one or more computer readable storage media for execution by at least one of the one or more processors, to:
identify the role of the first participant, wherein the first participant is a host of the meeting of the meeting request; and
exclude one or more time slots of the identified respective available time slots, wherein the one or more time slots conflict with the preferences of the first participant.

18. The computer system of claim 15, further comprising program instructions, stored on the one or more computer readable storage media for execution by at least one of the one or more processors, to:
generate a notification that includes a proposed rescheduling notice; and
transmit the notification to one or more participants of the plurality of requested meeting participants.

19. The computer system of claim 15, wherein program instructions to identify the respective available time slots of the plurality of requested meeting participants, further comprise program instructions to:
retrieve calendar data corresponding to a first participant;
identify one or more available time slots of the calendar data, wherein the one or more available time slots is selected from a group consisting of: hard time slots and soft time slots, wherein the hard time slots and soft time slots are characterized by an assigned weighted score that is based at least in part on a role of the first participant; and
assign a weighted score to the one or more available time slots based on events of the one or more available time slots.

20. The computer system of claim 15, wherein program instructions to identify the respective roles of the plurality of requested meeting participants, further comprise program instructions to:
retrieve data corresponding to a role of a first participant of the meeting;
determine a flexibility of a schedule corresponding to the role of the first participant of the meeting; and
assign a weighted score to the role of the first participant of the meeting based on the flexibility of the schedule associated with the role of the first participant of the meeting.

* * * * *